INVENTORS.
Seth J. Wheatley
David B. Rains
BY. Roland A. Anderson
ATTORNEY.

3,484,391
PHENOLIC FOAM COMPOSITION
Seth J. Wheatley, Clinton, and David B. Rains, Kingston, Tenn., assignors to the United States of America as represented by the United States Atomic Energy Commission
Filed Apr. 14, 1966, Ser. No. 542,697
Int. Cl. C08g *53/08, 51/10*
U.S. Cl. 260—2.5     3 Claims

ABSTRACT OF THE DISCLOSURE

A phenolic foamable composition is provided comprising by weight percent 62–72% phenolic resin, 0.5–2.0% silicone, 3–10% foaming agent, 8–13% boric anhydride, 8–13% anhydrous oxalic acid and 5–18% fiber glass. The foam compositions, which are extremely shock resistant, have successfully withstood temperatures up to about 2200° F. for one hour with little or no shrinkage or cracking.

---

Figure 1:
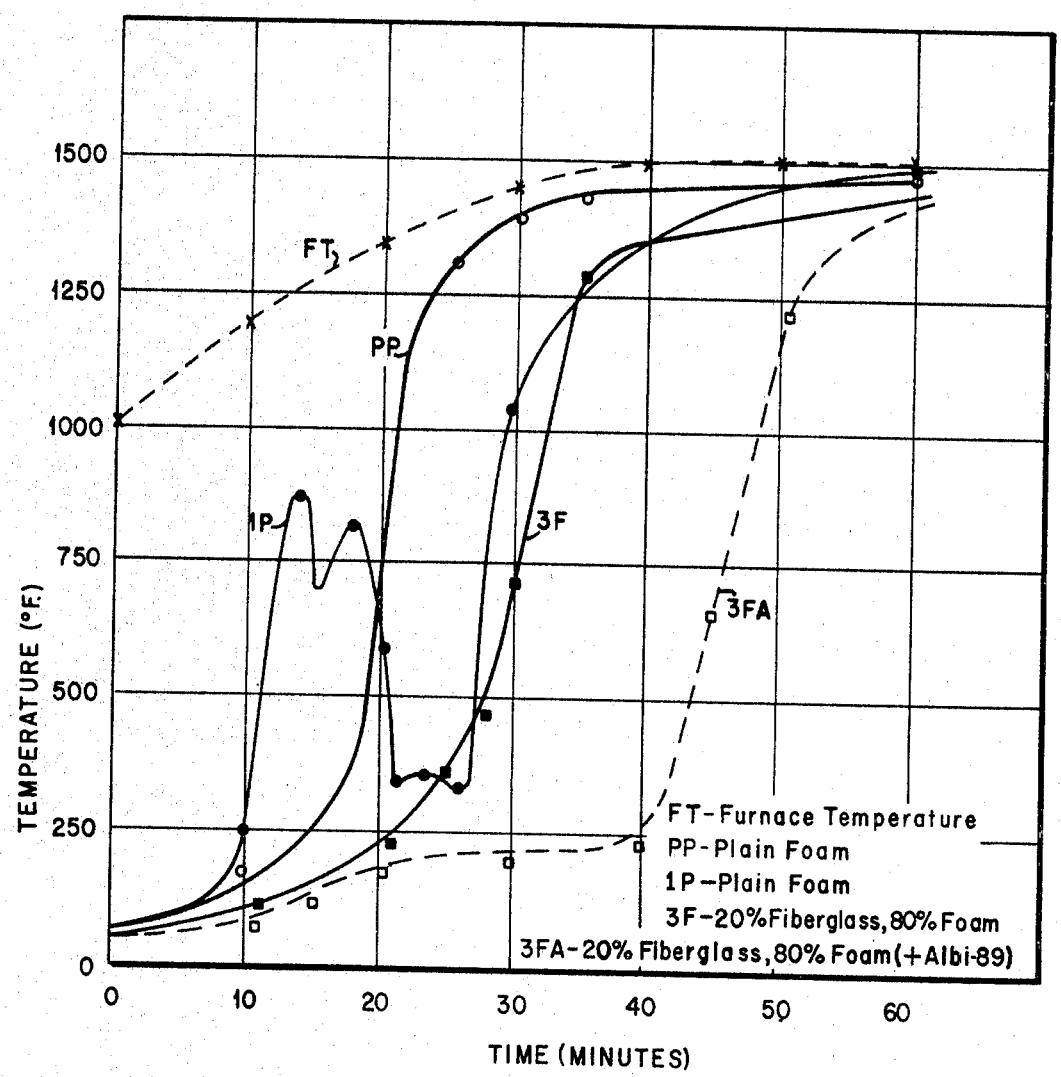

The invention described herein was made in the course of, or under, a contract with the U.S. Atomic Energy Commission.

The present invention relates generally to foamed media and more particularly to a high temperature, shock resistant foamed composition, such foamed compositions being especially useful as an insulating medium at temperatures up to about 2200° F.

The manufacture of cellular, expanded, thermoset resin structures which are of light weight, high strength-to-weight ratio and have good thermal resistance, is well-known in the art and generally comprises converting a resinous material to a foamed structure by chemical, physical or mechanical methods. One such type foam system is a phenolic base foam. In the production of such foams a phenolic resin is initially prepared by reacting phenol, cresol, and the like with an excess of an aldehyde, such as formaldehyde, in the presence of an alkaline catalyst such as sodium hydroxide. The resin is then cooled and neutralized by acid addition. A foamable composition is then prepared by reacting the phenolic resin with an acid condensing or curing agent, a foaming agent, and a surfactant. The particular agents and quantities employed varies for each particular foam composition and a detailed discussion of such variables may be found in The Chemistry of Phenolic Resins, Robert W. Martin, John Wylie & Sons, Inc., New York, at pages 88–98 and cited references. These phenolic foamable compositions, upon being heated to a charring point, characteristically undergo shrinking and severe cracking, and while they are heat resistant, the service or working temperature (that wherein the foam composition will not undergo shrinking and cracking) is quite low and is generally limited to about 250° F.

Numerous additives, such as fillers, plasticizers, or other monomers or polymers have been incorporated into the basic foam compositions to modify the foam properties. Fillers, such as wood flour, cotton linters, canvas, asbestos, and mica, have been provided to increase the strength and shock resistance of the foams; while, on the other hand, various inorganic and organic fibers have been utilized to improve the heat insulating properties of the foam compositions. These, however, have been found to extend the working temperature of the foam only up to about 300–350° F. In one method disclosed in U.S. Patent 2,895,173 filed on July 7, 1955 in the name of John K. Atticks for "Porous Resin Composition and Method of Using and Preparing Same," a high density, high strength foamed composition was prepared by adding short fibers of nylon, rayon or fiber glass to the foamable composition. There, the filler fibrous material, such as nylon, was provided in a range of about 20 to 95% by weight of the resulting mixture, preferably about 25% of fiber, to 75% of a cementing agent. The fibers, which are bonded at their joints in random orientation, provide a non-cellular loosely felted structure of low density which is subsequently compacted on expansion of the expandable agent to a high density matrix; thus, while the composition has improved heat resistance, its primary advantage is as a high density, high strength foamable composition and has a working temperature of only about 300° F.

It is desirable to provide a foamed composition which affords excellent heat insulation at extremely high temperatures such as would be encountered in gasoline and/or jet fuel fires wherein temperatures reach about 2000° F. and at the same time affords high shock resistance to prevent rupture of the container, which would result in direct exposure of valuable cargo to such flames. This becomes extremely important where, in the transportation of fissile material, for example, the containers might be subject to wreckage and attendant fires that may cause serious radiation hazards.

It is therefore a primary object of this invention to provide an improved foamed composition.

Another object is to provide an improved foamed composition of the phenolic foam type.

Still another object is to provide an improved foamed composition wherein said composition has high heat resistance and shock resistance over a range of working temperatures up to about 2200° F.

These and other objects which will be apparent to those skilled in the art are accomplished by incorporating fiber glass rovings in a phenolic foamable composition in a hereinafter described critical compositional range. More specifically, the foaming composition according to this invention comprises by weight percent 62–72% phenolic resin, 0.5–2.0% silicone surfactant, 3–10% foaming agent, 8–13% boric anhydride, 8–13% anhydrous oxalic acid and 5–18% fiber glass. Applicants have found quite unexpectedly that the addition of from 5–18 weight percent (based on total weight of foamed composition) fiber glass rovings to a phenolic foamable composition markedly improves the range of working temperatures of these foams. As used hereinafter the term plain foam will be employed to denote foam compositions which have no fiber glass additives.

As has been stated before, phenolic foams, while being heat resistant, had a maximum working temperature of about 300°–400° F. When exposed to temperatures in excess of this working temperatures, these foams experienced severe shrinkage and cracking which significantly impaired the insulating property of the foam. In contrast thereto, foam compositions formulated in accordance with this invention have successfully withstood temperatures up to about 2200° F. for one hour with little or no shrinkage or cracking. Where, for example, insulation tests of gallon-size containers were made with prior art phenolic foams, center line temperatures (i.e., temperature inside core container) reached above 900° F. within 12–14 minutes at a furnace temperature of about 1250° F., whereas center line temperatures remained below 200° F. for 18 minutes and only exceeded 300° F. after about 25 minutes at a furnace temperature of about 1300° F. with the present foam compositions as the insulating medium.

While it may be seen from FIGURE 1 that these foam compositions after about 60 minutes approached the furnace temperature, it should be apparent that these tests were made only for comparison purposes and are quite limited. In all cases the foam was found to char com pletely through, thus giving rise to the increase in temperature, after charring was completed, to that of the furnace. Foam compositions prepared in accordance with this invention in greater thicknesses were found to char only to a depth of about 3 inches with the remainder of the foam remaining unaffected, and thus affording excellent heat insulation. On the other hand, plain foam was found to undergo severe cracking which extended deep inside the material, and as a result of such cracking, the foam was found to char through to the extent of the cracks, resulting in poorer heat insulation.

Foam densities ranging from 3.5 to 8.5 lbs./ft.$^3$ were attained with k factors varying from about $$\frac{0.3-0.4 \text{ B.t.u./hour/ft.}^2}{{}^\circ\text{F. inch}}$$

Moreover, drop tests demonstrated that these foams not only had excellent heat insulating properties at extremely high temperatures but also were extremely shock resistant, having an ultimate bending strength of 37 pounds per square inch at 5 lbs./ft.$^3$ density.

The exact mechanism by which the fiber glass rovings achieve such improved results is not known. While it might be postulated that the fiber glass rovings act as a cohesive or binding medium within the foam composition, experiments demonstrated that at the maximum working temperature attainable i.e., up to about 2200° F., the fiber glass is completely molten (fiber glass softening temperature is about 1500° F.) and would appear to be completely ineffective as a cohesive agent. Furthermore, inasmuch as the fiber glass rovings are relatively short lengthened ($\sim$1/8″ to 1/4″) it would appear to negate the postulated binding effect.

The quantity of fiber glass rovings incorporated into the phenolic foam is critical. Where the additions of fiber glass were below 5 percent by weight, the fiber glass was ineffective in precluding deleterious shrinkage and cracking of the foam at temperatures above 1500° F. On the other hand, where the quantity of fiber glass exceeded 20 percent by weight, mixing into a homogeneous mixture became more difficult, resulting in agglomeration of the fiber glass strands. More importantly, foam compositions having greater than 20 percent by weight fiber glass, while they appeared to have good strength, were not completely satisfactory since large voids were found in the material which resulted in a reduction in the heat insulation properties of the foam. It is believed that, as the fiber glass quantity exceeds 20 percent by weight, the larger concentration of fibers increases the possibility of discrete fibers bonding together into balls, thus destroying the homogeneity of the mixture. Where this occurs voids are formed in the foam composition which seriously impairs the strength of the foam and greatly reduces the effectiveness in precluding shrinkage and cracking when exposed to any temperature in excess of the ignition temperature of the foam. It may, accordingly, be seen that, only where the fiber glass is incorporated in a quantity of between 5–18 percent by weight, are the marked improvements in such foam compositions achieved. The term rovings as used herein refers to strands of fiber glass which are made up of individual fibers. The rovings, which have diameters ranging up to 0.007 inch, may vary in length and preferably comprise short strands ranging from 1/8″ to 1/4″ in length.

The phenolic resins for use in the foamable composition are prepared by reacting phenolics and aldehyde components well-known in the art. In this respect, the exact identity of the phenolic resin is relatively unimportant so long as the resin is one which is curable to a thermoset condition and can be incorporated into a foamable composition by conventional techniques. The various phenolic components which are useful in the preparation of such foamable compositions are, for example, phenols, cresols, xylenols, and phenolic homologs and derivatives having at least one hydroxyl group in the molecule as well as mixtures thereof. With respect to the aldehyde component, it is preferred to employ formaldehyde with other equivalent aldehydes being useful also. The ratio of phenol to formaldehyde may vary over a range of values with ratios, for example, of from about 1 mol to about 2.5 mols of formaldehyde being used per mol of phenol. The variations of constituents and reaction parameters which may be employed in successfully carrying out the preparation of the phenolic resin starting material may be found in The Chemistry of Phenolic Resins cited supra.

In carrying out the invention the foamable compositions are formulated by initially preparing a liquid preblend mixture of resin, surfactant, and foaming agent. For this, a preferred formulation consists by weight percent (based on weight of final foam mixture) of 65% phenolic resin, 2.0% silicone surfactant and 7.0% trichlorotrifluoroethane, respectively. To this mixture bits of multistrand fiber glass rovings, chopped to lengths varying from 1/8″ to 1/4″, are slowly added to form a slurry or dispersion in a preferred amount comprising 10 percent by weight of the mixture and blended into a homogeneous mixture.

An acid condensing agent or curing agent is then added with stirring to the mixture to initiate the foaming reaction. The curing agent, which consists preferably of 8 percent of boric anhydride and 8 weight percent of anhydrous oxalic acid (based on weight of final foam mixture), is preferably premixed prior to combining with the mixture containing the resin, surfactant, foaming and fiber glass rovings.

The resulting mixture is immediately poured into a suitable mold or container for accommodation of the foaming reaction. As is characteristic of the phenolic foams, the spontaneous foaming and curing reaction is highly advantageous in that the core container can be loaded and spaced from the outer container and the foaming composition poured into the annulus and foamed in situ completely enveloping the core container. The foaming reaction is exothermic and while the heat generated by the reaction is generally sufficient to heat the foamed composition to a temperature to effect curing, external heat may be employed to facilitate the curing. This is especially beneficial where small quantities of foamable composition are employed and where utilized, preferably comprises heating the container to a temperature of about 140° F. for about 30 minutes. Where the exothermic heat is used to effect curing, it is preferred to allow the container to sit for 24 hours to insure that the curing phase is complete.

While not essential to the practice of the invention, the outer container may be coated with paints, mastics, or other fire resistant materials to improve further the heat resistance of the container to high temperature exposure. As noted in FIGURE 1, where an intumescent paint such as Albi #89 (commercially available from the Albi Manufacturing Company) is used in conjunction with the present foam compositions, center line temperatures remained below 250° F. for 40 minutes exposure to a furnace temperature of about 1500° F.

During the foaming reaction, gases are generated which require venting to obviate pressure buildup within the container. These gases are non-toxic and are otherwise innocuous. Where, for example, a closed container is required, vent holes may be provided in the container top and after foaming takes place, plugged with a suitable material such as a water repellent paint or a non-combustible material. It should be apparent that the resulting density of the foamed composition is dependent upon a number of variables, including among others, formulation ratios and container height and configuration. The density of the foamed composition increases as the container height increases, due principally to the added resistance of the foam as the foam height increases; and where a formulation is desired to provide an optimum shock resistant and heat resistant foam, densities of 5–8 pounds per cubic foot are preferred.

Having thus described the present invention in a general fashion, the following examples are provided to illustrate the quantitative aspects and procedures in greater detail.

EXAMPLE I

A series of phenolic foam compositions according to the invention were prepared in gallon-size containers as follows: a preblend liquid mixture comprising 100 parts by weight (200 grams) phenolic resin (commercially available from Union Carbide Corporation and designated as UCC BRL #2760), 3 parts by weight (6 grams) silicone surfactant (available from Union Carbide Corporation and designated as UCC L–530) and 10 parts by weight (20 grams) trichlorotrifluoroethane was prepared by mixing and blending for about two minutes in an eccentric lobe mixer. Fiber glass rovings available commerically in lengths ranging from $\frac{1}{8}''$ to $\frac{1}{4}''$ and having diameters of about 0.007 inch were added slowly, with continued stirring, to the blend in amounts varying from 0–25 percent by weight of the blend and homogenized to a uniform mixture. While the compositions were easily homogenized with fiber glass additives below 20 percent, the fiber glass tended to ball up with individual rovings sticking together to form a non-homogeneous mixture for the 20 and 25 percent by weight additions.

An acid curing agent (solid powder) which was prepared by mixing equal quantities of 12.5 parts by weight (25 grams) of 200 mesh (USSS) boric anhydride and anhydrous oxalic acid together, was slowly added to the preblend mixture with continued stirring and immediately thereafter the containers were capped with vented lids and placed in an oven and cured for one hour at 140° F., except the composition containing 25 percent by weight fiber glass which required heating at 140° F. for 18 hours to cure the foamed composition.

After curing, each container was loaded onto a mechanical press (2 in.$^2$ ram) and struck a sharp blow on the bottom edge of the container.

The containers were next placed in a high temperature furnace maintained at 1600° F. for one hour to test the heat resistance of the various foam compositions. Thereafter the containers were removed from the furnace, the lids removed and the containers allowed to cool.

Results

All of the compositions had charred completely through, indicating the severity of the high temperature test. The foam composition containing 0% to 2% fiber glass rovings experienced excessive shrinkage, pulling away from the container walls and had severe cracks through the material with no strength. Cracks were found where the indentation was made by the mechanical press indicating low structural strength.

The foam composition having 5% fiber glass rovings had good strength (no cracking across the area stamped with the mechanical press) and experienced little or no shrinkage. The integrity of the foam was maintained with no voids being detected and was otherwise suitable. The foam composition containing 15% fiber glass was dropped as it was removed from the furnace and had a number of deep cracks due probably to the fall. Thus, the comparison with other foam compositions was destroyed. The foam composition, however, was found to have good strength with no voids detected.

The foam composition having 20% fiber glass, while it did not appear to undergo excessive shrinkage, large voids with small cracks across the area stamped with the mechanical press were found in the material indicating, as noted upon mixing, the difficulty in achieving a uniform homogeneous mixture prior to foaming. Areas of the charred material upon visual examination were found to contain concentrations of fiber glass strands which resulted in diminished structural strength as well as apparent decrease in heat insulating properties.

The foam composition containing 25% fiber glass was completely unsatisfactory. The foam composition had no strength, and numerous voids and deep cracks through the material were found when the foam composition was cut open. The fibers were balled in mat fashion which resulted in severely diminishing the structural and heat resistance of the foam composition.

EXAMPLE II

Formulation

A foamed composition prepared as in Example I containing 100 parts by weight (40 lbs.) phenolic resin, 3 parts by weight (1.25 lbs.) silicone surfactant, 10 parts by weight (3.75 lbs.) trichlorotrifluoroethane, 10 percent by weight (5.5 lbs.) fiber glass rovings and 5.1 lbs. each of 200 mesh boric anhydride and anhydrous oxalic acid powder.

The resulting mixture was charged into a 73 gallon steel drum, which was provided with a centrally disposed upstanding steel core, to accommodate the foaming reaction. The core was adapted to receive a standard 5-inch diameter $UF_6$ cylinder which contained ferrous sulfide crystals simulating the weight of a charge of $UF_6$ and was mounted upon wood blocks so that the entire core was spaced from the outer drum. The total capacity of the drum-to-core spacing was 7.8 ft.$^3$ and the foam thickness was approximately 6 inches.

The drum was capped with a vented lid to facilitate removal of reaction gases during the foaming phase and the vent holes plugged with polyethylene prior to testing. It should be noted that, unlike the small gallon-size containers employed in Example I, the exothermic heat of reaction may be utilized to cure the foam where multigallon size containers are employed and curing is essentially complete in about 12–18 hours.

Testing

The loaded drum (total weight—300 lbs.) was dropped onto a concrete flat pad reinforced with steel rods. Imbedded steel cross beams were used to support a flush surface slab of 4-inch-thick armor steel plate.

The drum was dropped on the base rim at a 45° angle from a height of 30 feet with the loaded end down. The rim section which extends beyond the base of the drum folded inwardly from the impact.

Following the 30-foot drop test, the drum was placed in a diesel oil fire (temperature—approximately 1600° F.) for a total thermal exposure of 100 minutes. Micromax temperature information was obtained by thermocouples that were clamped to the top and side of the drum and temperature-indicating pellets in increments from 120° to 500° F. were positioned on the inner components. Subsequently, the drum after being immersed in water for 24 hours to a depth of 3 feet after cooling for one hour was cut open for inspection of its contents.

Results

From the drop, the foam composition, which had a density of about 5.6 lbs./ft.$^3$, provided excellent structural support with apparently no measurable shifting of the foamed composition occurring. There were planar cracks in the foam apparently caused by slight lateral movement as the foam compressed and then returned to position. A separation of about $\frac{1}{8}$ inch was evident for a short distance between the foam and the top section of the inner container but good binding of the foam to metal was observed on the remainder of the container.

The foam was found to be uniformly charred on all sides of the drum to a depth of about 2 inches. The foam had maintained its integrity despite crushing in the region adjacent to the impact area and there was no measurable change in the position of the $UF_6$ cylinder during the tests. The temperature-indicating pellets positioned on the inner container and the cylinder indicated a maximum temperature of 120° F. on the inside wall of the inner container and <120° F. on the side of the cylinder near the top and the bottom.

While earlier experiments demonstrated that the foam, which is of 20% closed cellular construction, did not show significant pentration (6 inch cube immersed under 4 feet of water for 72 hours showed less than 1/16 inch of water penetration), the heat affected the closed cellular structure of the foam since water had penetrated the material to within one inch of that surrounding the 6 inch cylinder section of the inner container. However, no water was found in the inner container and the $UF_6$ container itself is water tight for added protection from, among other things, moisture. The foam was, otherwise, found to be an excellent structural insulating medium which afforded an extremely high degree of protection to the $UF_6$ container.

EXAMPLE III

A foam composition for a gallon-size container consisting of 200 grams phenolic resin, 6 grams silicone surfactant and 20 grams of trichlorotrifluoroethane with 10% by weight fiber glass rovings and 25 grams of boric anhydride and 25 grams of anhydrous oxalic acid was mixed as in Example I. The foam composition was placed in a gallon container and cured for one hour at 140° F. The container was then placed in a furnace and heated to a temperature of 2200° F. for one hour, removed, allowed to cool, and examined. The foam maintained its integrity and experienced no further deterioration than those tested in Example I at 1600° F. There were no cracks and/or shrinkage of the foam found.

EXAMPLE IV

A foam composition for a gallon-size container was formulated and prepared as in Example III except 6 grams of Dow-Corning #202 (silicone surfactant) commercially available from Dow Corning Corporation was used instead of the UCC L–530 surfactant. The foam was tested at 1600° F. for one hour and found to be comparable to foam tested in Example I.

EXAMPLE V

Four gallon-size canisters were formulated and prepared as in Example I, except the first two canisters contained no fiber glass rovings and the remaining two canisters contained 10% by weight fiber glass rovings. One of the canisters containing 10% fiber glass was lined with a heavy intumescent paint (Albi #89) commercially available from Albi Manufacturing Company.

Thermocouples, which were imbedded within the center of each canister and provided with asbestos covered leads, provided temperature measurements.

The canisters, after curing for one hour at 140° F., were placed in a furnace and heated from 1000° F. to a maximum of 1500° F. over a heating period of about one hour. The canisters were then removed, permitted to cool and the lids removed for inspection.

The center line temperatures of each canister are plotted graphically in FIGURE 1 and demonstrate the superior heat insulating properties of the foamed compositions formulated in accordance with the invention as compared with a phenolic foam without fiber glass additives. As shown, the two curves for foam without fiber glass vary significantly. However, the curves are both representative of the behavior of the plain foam. The first curve (IP) was found to increase in temperature and at about 400° F. severely crack open with continued increase in temperature with the interior actually burning. When the inside charred, the char provided an insulating effect which accounted for the decrease in center line temperature; and after about 30 minutes the foam was charred completely through, resulting in a temperature increase approaching that of the furnace. On the other hand the plain foam (PP), where the cracks do not propagate into the center of the foam, did not experience the characteristic hump as shown in curve (IP) but was found to have a more gradual temperature rise approaching the furnace temperature after about 30 minutes.

The instant foam compositions demonstrated improved heat insulating properties as shown in FIGURE 1 over that of the plain foam and, where provided with a fire retardent paint, still an even greater improvement was found. It should be apparent that the time delay for the upward swing as shown in the curves in FIGURE 1 is even more magnified where larger insulation thicknesses are employed.

Example VI demonstrates the heat insulation properties of thicker foams as would be incorporated for a 2½ ton $UF_6$ container.

EXAMPLE VI

A foamed composition was prepared as in Example I with the following constituents: 100 parts by weight (197 lbs.) phenolic resin, 3 parts by weight (6 lbs.) silicone surfactant, 10 parts by weight (19 lbs.) trichlorotrifluoroethane, 25 lbs. each of 200 mesh boric anhydride and anhydrous oxalic acid powder and 10 parts by weight (27 lbs.) of fiber glass rovings.

The resulting mixture was charged batchwise into a cylinder (3.5′ O.D. x 8′ in length) which was provided with a centrally disposed upstanding steel core (30″ O.D. x 7′ in length) to accommodate the foaming reaction. The core was adapted to receive a standard 30-inch diameter $UF_6$ cylinder which contained ferrous sulfide crystals to simulate the weight of a charge of $UF_6$ (~2½ tons) and was mounted upon wood blocks so that the entire core was spaced from the outer drum. The total capacity of the drum-to-core capacity was 37.5 ft.$^3$, and the foam thickness was approximately 6 inches.

The container was drop and fire tested (~1700° F.) as in Example II. The foam composition was found to be an excellent structural support with apparently no measurable shifting of the foam composition or the $UF_6$ container. The center line temperature as measured with temperature-indicating pellets at the $UF_6$ cylinder wall was below 200° F. and along the inner container walls below 250° F. The foam was found to be uniformly charred to a maximum depth of about 2 inches without any cracks or shrinkage noted. It should be noted that even for such large containers, the batch pouring did not affect the insulating properties of the final foam composition.

Example VII illustrates that the fiber foam maintains its structural integrity even at extremely cold temperatures.

EXAMPLE VII

A foam composition for a gallon-size bucket was formulated and prepared as in Example I with 10% fiber glass.

A brass cylinder (weight —1635 grams) was imbedded within a gallon-size container which was fitted with a stand pipe to seal and protect the copper-constantan thermocouples leads from the ice-slush. The foam composition was of a uniform thickness (1⅞″) around the brass cylinder, and the assembly was placed in a large container of dry ice-slush maintained at a temperature of about —160° F. Similar assemblies were tested with cork and vermiculite.

Figure 2:
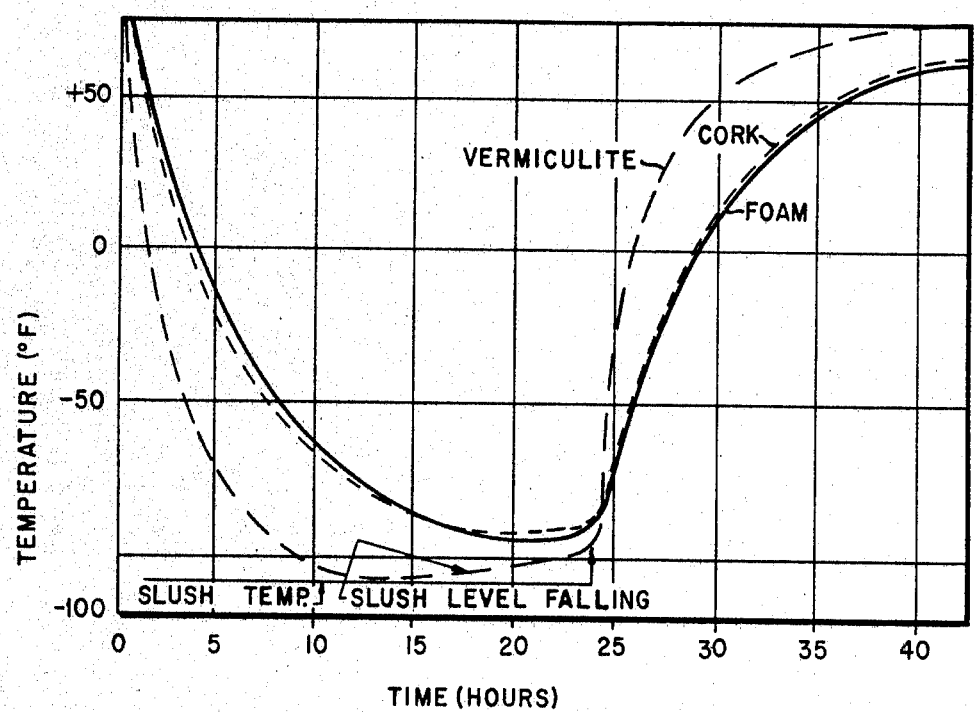

The temperature of the brass cylinder was plotted against elapsed time and the results are shown in FIGURE 2.

The results demonstrate that the foam is comparable with cork and superior to vermiculite as a low-temperature insulation. The heat conductivity value ($k$) of the foam was determined by comparison with the curves for cork and approximates $$\frac{0.32 \text{ B.t.u./hour/ft.}^2}{° \text{F. inch}}$$

at 75° F.

What is claimed is:

1. A heat resistant, shock resistant phenolic-aldehyde resin foamed composition capable of withstanding temperatures up to about 2200° F. without substantial shrinkage or cracking comprising essentially by weight of: 62–72% phenolic-aldehyde resin, 0.5–2.0% silicon surfactant, 3–10% trichlorotrifluoroethane, 8–13% boric anhydride, 8–13% anhydrous oxalic acid and 5–18% fiber glass rovings.

2. The composition of claim 1 wherein said composition has a working temperature of 2200° F., an ultimate bending strength of 37 p.s.i. and a $k$ factor of 0.32 B.t.u./hr./° F./ft.$^2$/inch of thickness.

3. The composition of claim 1 wherein said weights of constituents comprise essentially 65% phenolic resin, 2.0% silicone surfactant, 7% trichlorotrifluoroethane, 8% boric anhydride, 8% anhydrous oxalic acid and 10% fiber glass rovings.

References Cited

UNITED STATES PATENTS

| | | |
|---|---|---|
| 2,582,228 | 1/1952 | Brinkema. |
| 3,267,048 | 8/1966 | Horste et al. |
| 3,298,973 | 1/1967 | Quarles et al. |

MURRAY TILLMAN, Primary Examiner

W. J. BRIGGS, SR., Assistant Examiner

U.S. Cl. X.R.

252—62; 260—31.2, 33.8, 38